United States Patent
Heo et al.

(10) Patent No.: US 9,543,843 B2
(45) Date of Patent: Jan. 10, 2017

(54) POWER SUPPLY DEVICE

(71) Applicant: SAMSUNG ELECTRO-MECHANICS CO., LTD., Suwon, Gyunggi-do (KR)

(72) Inventors: Tae Won Heo, Gyunggi-do (KR); Hwan Cho, Gyunggi-do (KR); Jeong Gyu Lim, Gyunggi-do (KR); Sang Kyoo Han, Seoul (KR); Young Seung Noh, Gyunggi-do (KR); Bo Mi Lee, Gyunggi-do (KR)

(73) Assignee: SOLUM CO., LTD., Gyeonggi-do, Suwon-si (KR)

( * ) Notice: Subject to any disclaimer, the term of this patent is extended or adjusted under 35 U.S.C. 154(b) by 30 days.

(21) Appl. No.: 14/194,087

(22) Filed: Feb. 28, 2014

(65) Prior Publication Data

US 2015/0109832 A1    Apr. 23, 2015

(30) Foreign Application Priority Data

Oct. 17, 2013 (KR) ........................ 10-2013-0123984

(51) Int. Cl.
*H02M 3/335* (2006.01)
*H02M 1/00* (2006.01)
*H02M 1/44* (2007.01)

(52) U.S. Cl.
CPC ..... *H02M 3/33507* (2013.01); *H02M 3/33523* (2013.01); *H02M 1/44* (2013.01); *H02M 2001/0032* (2013.01)

(58) Field of Classification Search
CPC .................. H02M 2001/0032; H02M 3/33507; H02M 1/44; H02M 3/33523
See application file for complete search history.

(56) References Cited

U.S. PATENT DOCUMENTS 4,870,555 A    9/1989  White
6,078,509 A    6/2000  Jacobs et al.
(Continued)

FOREIGN PATENT DOCUMENTS

CN    1675834 A    9/2005
CN    103190063 A    7/2013
(Continued)

OTHER PUBLICATIONS

Korean Office Action issued in Korean Application No. 10-2013-0123984 dated Oct. 31, 2014, with English translation.
(Continued)

*Primary Examiner* — Fred E Finch, III
*Assistant Examiner* — Rafael O De León Domenech
(74) *Attorney, Agent, or Firm* — McDermott Will & Emery LLP

(57) ABSTRACT

There is provided a power supply device having a primary side and a secondary side isolated from each other. The power supply device includes: a power supply unit converting power from the primary side to output the converted power to the secondary side; a control unit located on the secondary side and acquiring control information on the power supply unit based on a voltage output from the power supply unit; and a delivery unit delivering the control information to the primary side, the delivery unit including a Y-capacitor that provides an EMI noise path between the primary side and the secondary side.

4 Claims, 3 Drawing Sheets

(56) References Cited

U.S. PATENT DOCUMENTS

| | | |
|---|---|---|
| 7,256,662 B2 | 8/2007 | Wasaki et al. |
| 7,701,731 B2 | 4/2010 | Dhuyvetter et al. |
| 7,864,546 B2* | 1/2011 | Dhuyvetter et al. ............ 363/17 |
| 2005/0285693 A1 | 12/2005 | Wasaki et al. |
| 2012/0026698 A1* | 2/2012 | Chan et al. ................... 361/748 |
| 2014/0112031 A1* | 4/2014 | Chen ................. H02M 3/33592 363/21.14 |

FOREIGN PATENT DOCUMENTS

| | | |
|---|---|---|
| EP | 2173025 A1 | 4/2010 |
| JP | 5152185 B2 | 2/2013 |
| KR | 10-2002-0008668 A | 1/2002 |
| WO | 2012/028787 A2 | 3/2012 |

OTHER PUBLICATIONS

Chinese Office Action dated Aug. 24, 2016 issued in Chinese Patent Application No. 201410554350.2 (with English translation).

\* cited by examiner

POWER SUPPLY DEVICE

CROSS-REFERENCE TO RELATED APPLICATION

This application claims the benefit of Korean Patent Application No. 10-2013-0123984 filed on Oct. 17, 2013, with the Korean Intellectual Property Office, the disclosure of which is incorporated herein by reference.

BACKGROUND

The present disclosure relates to a power supply device.

In general, a switched-mode power supply (SMPS) is frequently used as a power supply device, since it is relatively small yet has high efficiency. Such a power supply device serves to supply a direct current (DC) voltage as required by a system from mains electricity. Typically, an electronic device used in the home or the office enters a normal mode in which power is normally supplied while it is actually used, and enters a standby mode in which it waits for an operation event while it is in an idle state or is not being used.

Power consumed in the standby mode is wasteful, and thus, various approaches to reducing power consumption in the standby mode have been proposed.

On the other hand, as types of electronic devices, such as mobile devices and portable multimedia devices have recently been diversified, various types of power conversion devices are required. In addition, while existing power conversion devices only need to stably supply power to a load, recent power conversion devices have to meet various other requirements.

Accordingly, in order to adapt to ever more complicated device structures and to meet various requirements, a novel power conversion device having improved performance and efficiency, with a reduced size, and having price competitiveness is required.

RELATED ART DOCUMENTS (Patent Document 1) Japanese Patent No. 5152185
(Patent Document 2) Korean Patent Laid-open Publication No. 2002-0008668

SUMMARY

An aspect of the present disclosure may provide a power supply device capable of reducing power consumption in a standby mode.

An aspect of the present disclosure may also provide a power supply device capable of accurately regulating an output voltage.

An aspect of the present disclosure may also provide a power supply device able to be reduced in size at low cost.

According to an aspect of the present disclosure, a power supply device having a primary side and a secondary side isolated from each other may include: a power supply unit converting power from the primary side to output the converted power to the secondary side; a control unit located on the secondary side and acquiring control information on the power supply unit based on a voltage output from the power supply unit; and a delivery unit delivering the control information to the primary side, the delivery unit including a Y-capacitor that provides an EMI noise path between the primary side and the secondary side.

The power supply device may further include: a driving unit located on the primary side, acquiring the control information from the delivery unit, and driving a switching element, the switching element being included in the power supplying unit and allowing and disallowing a primary current to flow through the primary side.

The delivery unit may include a capacitor element, a resistor element, and a diode element, wherein the resistor element is electrically connected between one terminal of the capacitor element and one terminal of the Y-capacitor element, the one terminal of the capacitor element is electrically connected to an anode of the diode element, and the other terminal of the Y-capacitor element is grounded.

The delivery unit may include: a first deliverer delivering first transition information from the control unit to instruct transition from a low level to a high level, and a second deliverer delivering second transition information from the control unit to instruct transition from the high level to the low level.

The first deliverer may include a first capacitor element, a first resistor element, and a first diode element, wherein the first resistor element is electrically connected between one terminal of the first capacitor element and one terminal of the Y-capacitor element, the one terminal of the first capacitor element is electrically connected to an anode of the first diode element, and the other terminal of the Y-capacitor element is grounded.

The second deliverer may include a second capacitor element, a second resistor element, and a second diode element, wherein the second resistor element is electrically connected between one terminal of the second capacitor element and one terminal of the Y-capacitor element, the one terminal of the second capacitor element is electrically connected to an anode of the second diode element, and the other terminal of the Y-capacitor element is grounded.

The power supply device may further include: a driving unit located on the primary side, acquiring the first and second transition information from the delivery unit, and driving the switching element based on the first and second transition information.

According to another aspect of the present disclosure, a power supply device may include: a power supply unit having a primary side and a secondary side, and a primary winding formed on the primary side and a secondary winding formed on the secondary side and inductively coupled to the primary winding, the power supplying unit including a Y-capacitor providing an EMI noise path between the primary side and the secondary side; a control unit located on the secondary side and acquiring control information on the power supply unit based on a voltage output from the power supply unit; and a delivery unit having a high-pass filter including the Y-capacitor and delivering the control information to the primary side.

The power supply device may further include: a driving unit located on the primary side, acquiring the control information from the delivery unit, and driving a switching element, the switching element allowing and disallowing a primary current to flow through the primary side.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
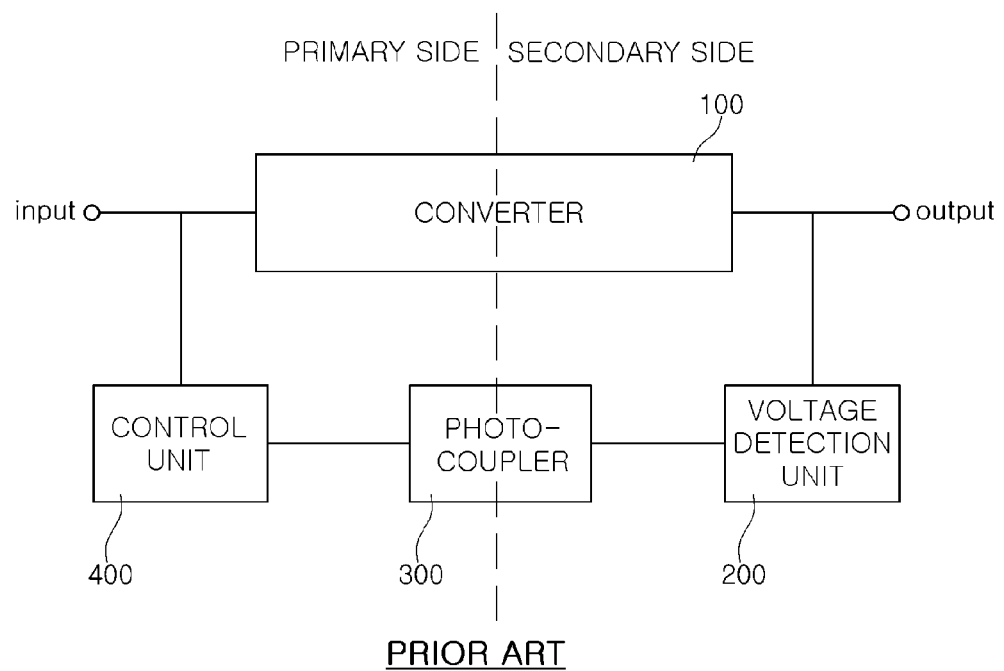
FIG. 1 is a block diagram of atypical isolated converter.

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. Throughout the drawings, the same or like reference numerals will be used to designate the same or like elements.

For the convenience of illustration, the configuration of a power supply device will be described in terms of a flyback converter in this specification.

As will be appreciated by those skilled in the art, however, the configurations according to exemplary embodiment of the present disclosure may be applied to a forward converter, a half-bridge converter, a full-bridge converter, a push-pull converter, a resonant converter or the like.

FIG. 1 is a block diagram of a typical isolated converter.

Referring to FIG. 1, the isolated converter may include a converter unit 100, a voltage detection unit 200, a photo-coupler 300, and a control unit 400.

The converter unit 100 may be configured based on a typical isolated converter topology.

Typically, the converter unit may include a primary side on which a primary winding is located and a secondary side on which a secondary winding, inductively coupled to the primary winding, is located.

The converter unit may receive an input power INPUT and may convert it to output an output voltage OUTPUT.

The voltage detection unit 200 may detect the output voltage OUTPUT.

The photo-coupler 300 may transmit information on the output voltage OUTPUT detected from the secondary side to the control unit 400 located on the primary side.

The control unit 400 may control the converter unit 100 based on the information on the output voltage OUTPUT. Specifically, the control unit 400 may output a control signal for controlling the converter unit 100.

In the power supply device thus configured, in order to ensure the stable operation of the voltage detection unit 200 and the driving of the photo-coupler, the level of the current flowing on the secondary side needs to be maintained above a certain level. Therefore, power is constantly consumed in the voltage detection unit 200, the photo-coupler 300 and peripheral circuits.

Recently, a very low level of power consumption in the standby mode is required, and thus the power supply device described above may not meet the requirements of power consumption in the standby mode.

In response to such requirements of power consumption in the standby mode, a primary side regulation (PSR) type power supply device has recently been provided.

The PSR type power supply device may detect voltage induced in the secondary winding of a transformer to drive a converter based on the detected voltage.

The PSR type power supply device may eliminate a voltage detecting unit, a photo-coupler, and peripheral circuits, so that power consumption may be reduced.

The PSR type power supply device, however, has a problem in that it may not accurately regulate an output voltage when a load is rapidly increased from a standby mode (no-load condition). Further, when this happens, a larger voltage drop occurs.

Further, output voltage is not directly detected by a power supply device but is indirectly detected using the secondary winding, the output voltage may not accurately regulated.

Figure 2:
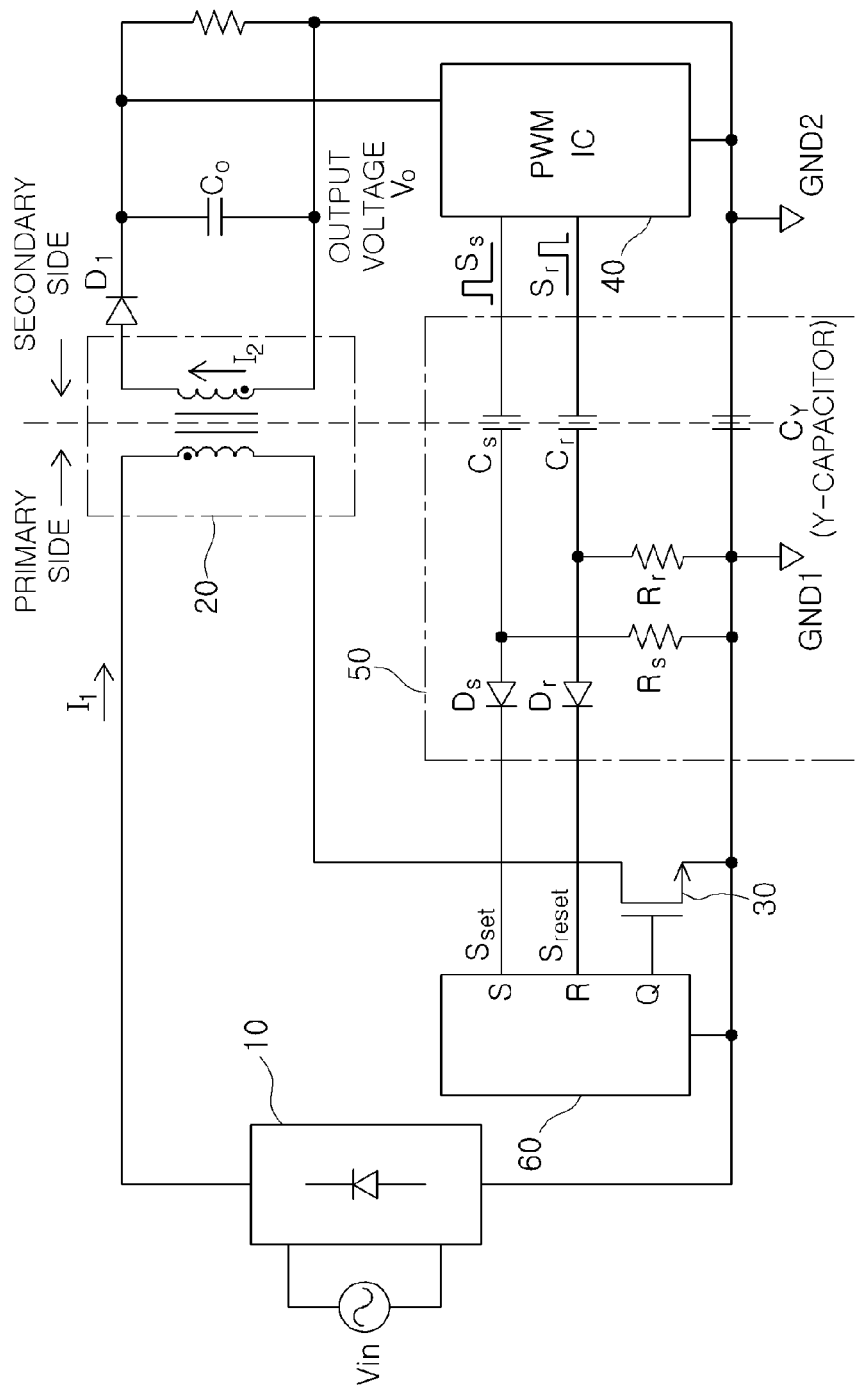
FIG. 2 is a diagram illustrating a flyback converter according to an exemplary embodiment of the present disclosure.

FIG. 2 is a diagram illustrating a flyback converter according to an exemplary embodiment of the present disclosure.

Referring to FIG. 2, the flyback converter may include a voltage source Vin, a transformer 20, a rectifying unit 10, a switching element 30, a control unit 40, a rectifying diode D1, a delivery unit 50, and a driving unit 60.

The voltage source Vin may supply input voltage. The input voltage may be alternating current (AC) voltage.

The rectifying unit 10 may receive and rectify AC voltage to transmit it to the transformer 20.

The transformer 20 may include a primary winding and a secondary winding inductively coupled to the primary winding. Herein, a primary side refers to the region in which the primary winding is located, and a secondary side refers to the region in which the secondary winding is located.

The transformer 20 may convert primary current I1 from the voltage source into secondary current I2.

The switching element 30 may allow or disallow the primary current I1 to flow through the primary winding of the transformer.

The switching element 30 may be implemented as one of an insulated gate bipolar transistor (IGBT), a metal oxide semiconductor field-effect transistor (MOS-FET), and a bipolar junction transistor (BJT).

The rectifying diode D1 may rectify the second current I2 of the transformer 20.

A capacitor element Co may stabilize the voltage transmitted from the rectifying diode D1.

The control unit 40 may acquire output voltage information Vo.

The control unit 40 may acquire control information on the switching element 30 based on the output voltage information Vo.

The control unit 40 may be located on the secondary side.

According to an exemplary embodiment of the present disclosure, the control unit 40 is located on the secondary side, so that output voltage may be directly detected and accurately regulated.

Figure 3:
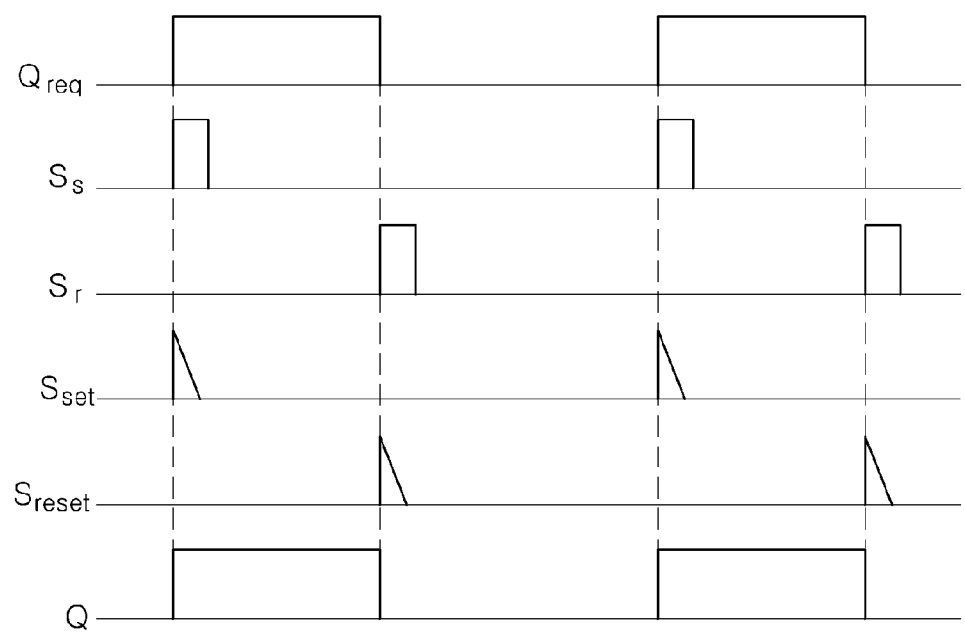
FIG. 3 is a diagram showing an example of waveforms from units shown in the block diagram of FIG. 2.

FIG. 3 is a diagram showing an example of waveforms from units shown in the block diagram of FIG. 2.

Referring to FIG. 3, the control unit 40 may acquire control information $Q_{req}$. In order to transmit the control information $Q_{req}$ the control unit 40 may output first transition information Ss to instruct transition from a low level to a high level, and second transition information $S_r$ to instruct transition from the high level to the low level.

The delivery unit 50 may deliver the control information to the driving unit 60 located on the primary side.

The delivery unit 50 may include a Y-capacitor Cy that provides an EMI noise path between the primary and secondary sides.

Specifically, the delivery unit 50 may include a first deliverer that delivers the first transition information from a low level to a high level, and a second deliverer that delivers the second transition information from the high level to the low level.

The first deliverer may include a first capacitor element Cs, a first resistor element Rs, a first diode element Ds, and a Y-capacitor element Cy.

Referring to FIG. 2, the first resistor element Rs may be electrically connected between one terminal of the first capacitor element Cs and one terminal of the Y-capacitor element Cy, the terminal of the first capacitor element Cs may be electrically connected to the anode of the first diode element Ds, and the other terminal of the Y-capacitor element Cy may be grounded. The other terminal of the first capacitor element Cs may be connected to the control unit 40, and the cathode of the first diode element Ds may be connected to the driving unit 60.

With this configuration, the first deliverer may operate as a high-pass filter. Further, the first deliverer may output transition information $S_{set}$ from a low level to a high level.

The second deliverer may include a second capacitor element Cr, a second resistor element Rr, a second diode element Dr, and the Y-capacitor.

Referring to FIG. 2, the second resistor element Rr may be electrically connected between one terminal of the second capacitor element Cr and one terminal of the Y-capacitor element Cy, and the terminal of the second capacitor element Cr may be electrically connected to the anode of the second diode element Dr. The other terminal of the second capacitor element Cr may be connected to the control unit 40, and the cathode of the second diode element Dr may be connected to the driving unit 60.

With this configuration, the second deliverer may operate as a high-pass filter. Further, the second deliverer may output transition information $S_{reset}$ from the high level to the low level.

That is, the deliver unit 50 according to an exemplary embodiment of the present disclosure may configure a high-pass filter using the Y-capacitor used as an EMI noise path between the primary side and the secondary side of a converter, to deliver the control information acquired by the control unit 40 to the driving unit 60 located on the primary side.

A pulse transformer (PT) is commonly used for delivering a signal between isolated regions.

In case that such a PT is located between the primary side and the secondary side of an isolated converter, there is a drawback that the size of the PT is very large in order to sufficiently isolate the primary side from the secondary side.

In contrast, the power supply device according to an exemplary embodiment of the present disclosure realizes the delivery of a signal between isolated regions using only the Y-capacitor, the resistor elements, the capacitor elements, and the diode elements, which are essential elements in providing an EMI noise path in a converter.

Therefore, the power supply device according to an exemplary embodiment of the present disclosure is very advantageous in terms of price and size. Further, the delivery unit according to an exemplary embodiment of the present disclosure may be easily applied to a semiconductor IC.

If a signal is to be delivered between the primary side and the secondary side of the power supply device, the signal may be delivered by virtue of the delivery unit 50.

The driving unit 60 may acquire control information from the delivery unit 50. Specifically, the driving unit 60 may acquire first transition information $S_{set}$ and second transition information $S_{reset}$ from the delivery unit 50 and to obtain control information $Q_{req}$ based thereon.

As can be seen from FIG. 3, the driving unit 60 may output a driving signal Q identical to the control information $Q_{req}$ based on the first transition information $S_{set}$ and the second transition information $S_{reset}$.

The driving unit 60 may output the driving signal Q so as to control the switching element 30.

Further, the control unit 60 may be located on the primary side.

According to an exemplary embodiment of the present disclosure, the driving unit may be implemented as a set-reset (SR) flip-flop. For example, the first transition information $S_{set}$ may be a set signal to a SR flip-flop, and the second transition information $S_{reset}$ may be a reset signal to the SR flip-flop.

In this way, the driving unit 60 may output the driving signal based on the control information acquired by the control unit 40 to the switching element 30.

The power supply device according to an exemplary embodiment of the present disclosure may significantly save power consumption in the standby mode, compared to a typical flyback converter using a photo-coupler.

Further, the power supply device according to an exemplary embodiment of the present disclosure may control output voltage more accurately than a PSR type converter. Additionally, the power supply device according to an exemplary embodiment of the present disclosure may overcome the problem of voltage drop arising in a PSR type converter when a load is rapidly changed.

Moreover, the power supply device according to an exemplary embodiment of the present disclosure may realize the delivery of a signal between isolated regions using only the Y-capacitor, the resistor elements, the capacitor elements, and the diode elements, which are essential elements in a converter to provide an EMI noise path, such that cost may be saved and size may be reduced.

As set forth above, according to exemplary embodiments of the present disclosure, a power supply device capable of reducing power consumption in a standby mode may be provided.

Further, according to exemplary embodiments of the present disclosure, a power supply device capable of accurately regulating an output voltage may be provided.

Furthermore, according to exemplary embodiments of the present disclosure, a power supply device may be provided with reduced size at low cost.

While exemplary embodiments have been shown and described above, it will be apparent to those skilled in the art that modifications and variations could be made without departing from the spirit and scope of the present disclosure as defined by the appended claims.

What is claimed is:

1. A power supply device having a primary side and a secondary side isolated from each other, the power supply device comprising:
   a power supply unit converting power from the primary side to output the converted power to the secondary side;
   a control unit located on the secondary side and acquiring control information on the power supply unit based on a voltage output from the power supply unit; and
   a delivery unit that delivers the control information to the primary side, the delivery unit including a Y-capacitor element that provides an EMI noise path between the primary side and the secondary side,
   wherein the delivery unit includes:
   a first deliverer delivering first transition information from the control unit to instruct transition from a low level to a high level; and a second deliverer delivering second transition information from the control unit to instruct transition from the high level to the low level, wherein the first deliverer includes a first capacitor element, a first resistor element, and a first diode element, wherein the first resistor element is electrically connected between one terminal of the first capacitor element and one terminal of the Y-capacitor element, the one terminal of the first capacitor element is electrically connected to an anode of the first diode element, and the other terminal of the Y-capacitor element is grounded, and wherein the second deliverer includes a second capacitor element, a second resistor element, and a second diode element, wherein the second resistor element is electrically connected between one terminal of the second capacitor element and the one terminal of the Y-capacitor element, the one terminal of the second capacitor element is electrically connected to an anode of the second diode element, and the other terminal of the Y-capacitor element is grounded.

2. The power supply device of claim 1, further comprising:

a driving unit located on the primary side, acquiring the first and second transition information from the delivery unit, and driving a switching element based on the first and second transition information.

3. A power supply device, comprising:

a power supply unit having a primary side and a secondary side, and a primary winding formed on the primary side and a secondary winding formed at the secondary side and inductively coupled to the primary winding, the power supply unit including a Y-capacitor element that provides an EMI noise path between the primary side and the secondary side;

a control unit located on the secondary side and acquiring control information on the power supply unit based on a voltage output from the power supply unit; and a delivery unit having a high-pass filter including the Y-capacitor element and delivering the control information to the primary side, wherein the delivery unit includes:

a first deliverer delivering first transition information from the control unit to instruct transition from a low level to a high level; and a second deliverer delivering second transition information from the control unit to instruct transition from the high level to the low level, wherein the first deliverer includes a first capacitor element, a first resistor element, and a first diode element, wherein the first resistor element is electrically connected between one terminal of the first capacitor element and one terminal of the Y-capacitor element, the one terminal of the first capacitor element is electrically connected to an anode of the first diode element, and the other terminal of the Y-capacitor element is grounded, and wherein the second deliverer includes a second capacitor element, a second resistor element, and a second diode element, wherein the second resistor element is electrically connected between one terminal of the second capacitor element and the one terminal of the Y-capacitor element, the one terminal of the second capacitor element is electrically connected to an anode of the second diode element, and the other terminal of the Y-capacitor element is grounded.

4. The power supply device of claim 3, further comprising: a driving unit located on the primary side, acquiring the first and second transition information from the delivery unit, and driving a switching element based on the first and second transition information.

* * * * *